(12) United States Patent
Huo et al.

(10) Patent No.: US 11,726,019 B2
(45) Date of Patent: Aug. 15, 2023

(54) VISCOUS DAMPER FLUID VISCOSITY MONITORING DEVICE AND METHOD BASED ON PIEZOCERAMIC TRANSDUCERS

(71) Applicant: DALIAN UNIVERSITY OF TECHNOLOGY, Liaoning (CN)

(72) Inventors: Linsheng Huo, Liaoning (CN); Shengbin Chen, Liaoning (CN); Jing Zhou, Liaoning (CN); Hongnan Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 116 days.

(21) Appl. No.: 17/618,377

(22) PCT Filed: Jul. 21, 2021

(86) PCT No.: PCT/CN2021/107484
§ 371 (c)(1),
(2) Date: Dec. 10, 2021

(87) PCT Pub. No.: WO2022/121319
PCT Pub. Date: Jun. 16, 2022

(65) Prior Publication Data
US 2022/0349799 A1 Nov. 3, 2022

(30) Foreign Application Priority Data

Dec. 11, 2020 (CN) .......................... 202011440305.6

(51) Int. Cl.
*G01N 11/16* (2006.01)
*G01N 11/00* (2006.01)

(52) U.S. Cl.
CPC ...... *G01N 11/16* (2013.01); *G01N 2011/0066* (2013.01)

(58) Field of Classification Search
CPC ........... G01N 11/16; G01N 2011/0066; G01N 11/00; G01N 2011/073; F16F 2224/0283; F16F 2228/008; F16F 9/3292
USPC ............................................. 73/54.01, 54.41
See application file for complete search history.

(56) References Cited

FOREIGN PATENT DOCUMENTS

| CN | 2089634 U | 11/1991 |
| CN | 104502235 A | 4/2015 |
| CN | 105403485 A | 3/2016 |
| CN | 206270205 U | 6/2017 |
| CN | 110195760 A | 9/2019 |

(Continued)

*Primary Examiner* — Robert R Raevis
(74) *Attorney, Agent, or Firm* — Muncy, Geissler, Olds & Lowe, P.C.

(57) ABSTRACT

The present invention belongs to the technical fields of civil engineering, smart material and health monitoring, and provides a viscous damper fluid viscosity monitoring device and method based on piezoceramic transducers, comprising piezoceramic transducers, wires, corks, a baffle and a viscous damper. When the fluid viscosity of the viscous damper changes, the energy dissipation of pressure waves during propagation in a fluid will change, and signals received by the piezoceramic transducers will change, so that the viscosity of the fluid in the viscous damper can be calculated by the amplitude change of the signals received. The device of the present invention has a simple structure and accurate monitoring results, and provides a simple and feasible method for real-time monitoring of fluid viscosity of viscous dampers in engineering.

2 Claims, 1 Drawing Sheet

(56) References Cited

FOREIGN PATENT DOCUMENTS

| | | |
|---|---|---|
| CN | 112683733 A | 4/2021 |
| WO | WO-2007114950 A2 | 10/2007 |

VISCOUS DAMPER FLUID VISCOSITY MONITORING DEVICE AND METHOD BASED ON PIEZOCERAMIC TRANSDUCERS

TECHNICAL FIELD

The present invention relates to the fields of civil engineering, smart material and health monitoring. More particularly, when the fluid viscosity of a viscous damper changes, the energy dissipation of pressure waves during propagation in a fluid will change, and signals received by piezoceramic transducers will change, so that the viscosity of the fluid in the viscous damper can be calculated by the amplitude change of the signals received. The monitoring device based on piezoceramic transducers provides a simple and feasible method for real-time monitoring of fluid viscosity of viscous dampers in engineering.

BACKGROUND

Viscous dampers are widely used in civil engineering to suppress structural vibration caused by earthquake or wind induced vibration, and the viscosity of a fluid used in a viscous damper has a great influence on the vibration suppression performance thereof. However, factors such as temperature and pressure will cause a change in the viscosity of the fluid during the use of the viscous damper. Therefore, in order to ensure the vibration suppression capacity of the viscous damper, it is necessary to monitor the viscosity of the fluid in the viscous damper in real time.

In recent years, structural health monitoring technology has been increasingly applied to civil engineering. Piezoceramic transducers are widely used in structural health monitoring due to the advantages such as high response speed, wide response frequency band and low cost. In addition, piezoceramic transducers can be used as both transducers and actuators because of the unique direct piezoelectric effect and converse piezoelectric effect thereof. The present invention just makes use of the direct piezoelectric effect and converse piezoelectric effect peculiar to the piezoceramic transducers.

Traditional piezoceramic transducers are aimed at the measurement or detection rather than monitoring of fluid viscosity, and cannot reflect the change of fluid viscosity quantitatively.

SUMMARY

To solve the above-mentioned problem, the present invention provides a viscous damper fluid viscosity monitoring device based on piezoceramic transducers, and a physical model of the viscosity monitoring device (as shown in FIG. 1).

It should be noted that the piezoceramic transducers work in a pair, with one transmitting signals and the other receiving signals. When the fluid viscosity of a viscous damper changes, the energy dissipation of pressure waves during propagation in a fluid will also change, causing signals received be changed, so that the viscosity of the fluid in the viscous damper can be calculated by the change information of the signals received.

The technical solution of the present invention is as follows:

A viscous damper fluid viscosity monitoring device based on piezoceramic transducers, comprising piezoceramic transducers 1, wires 2, corks 3, a baffle 4 and a viscous damper 5; two piezoceramic transducers 1 are arranged in the viscous damper fluid viscosity monitoring device, with one being used as a signal transmitter, and the other being used as a signal receiver; the piezoceramic transducers 1 are bonded to the surface of the corks 3 with epoxy resin, and then the corks 3 are bonded to the inner wall of cylinder of the viscous damper 5 with epoxy resin; a ring-shaped baffle 4 is arranged near the piezoceramic transducers 1 in the viscous damper 5 to protect the piezoceramic transducers 1 from being damaged during the use of the viscous damper 5; holes are formed in the inner wall of cylinder of the viscous damper 5 to lead out the wires 2 connected on the piezoceramic transducers 1 and are sealed well, and then the wires 2 led out are connected to external equipment.

The present invention has the following beneficial effects:

(1) The device relies on the piezoelectric effect of piezoceramics, and finally utilizes electric signals to monitor fluid viscosity, therefore it is not necessary to regularly remove the viscous damper for viscosity detection, which saves time and effort.

(2) The device adopts an active monitoring method to monitor the fluid viscosity of the viscous damper in real time without affecting the normal use of the viscous damper.

(3) The present invention has a simple structure, relatively few parts, low cost and simple installation, can accurately monitor the fluid viscosity, and has broad market promotion and application prospects.

Figure 1:
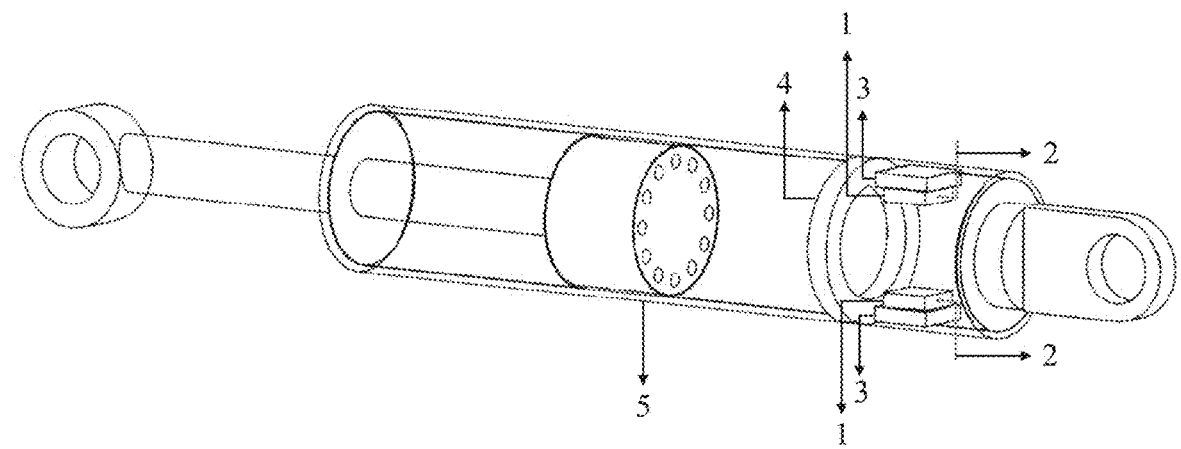
FIG. 1 is a schematic diagram of an overall physical profile of the present invention.
Figure 2:
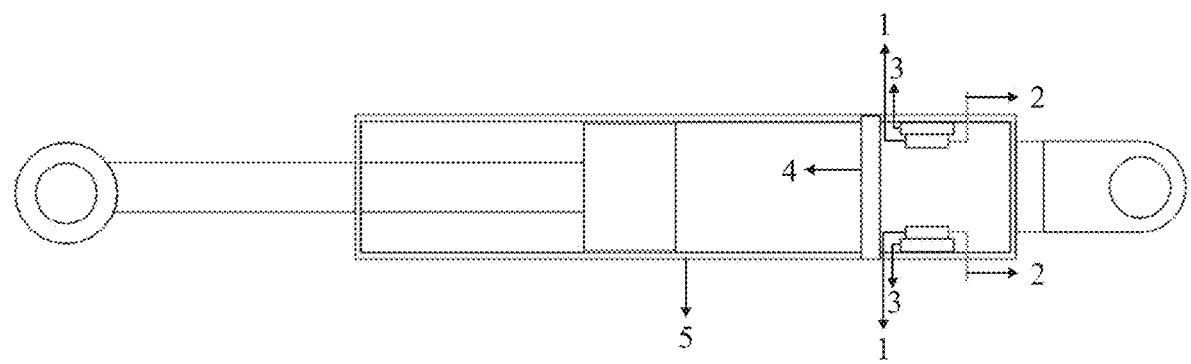
FIG. 2 is a front view of the present invention.

In the figures: 1 piezoceramic transducer; 2 wire; 3 cork; 4 baffle; 5 viscous damper.

DETAILED DESCRIPTION

The present invention provides a viscous damper fluid viscosity monitoring device based on piezoceramic transducers, and the specific embodiments are as follows:

Two piezoceramic transducers 1 encapsulated in copper shells and having stable performance are used, with one being used as an actuator, and the other being used as a receiver. The two piezoceramic transducers 1 are bonded to the surface of two corks 3 with epoxy resin, and after the epoxy resin is completely air dried, the two corks 3 are respectively bonded to the corresponding inner wall of cylinder of the viscous damper 5 with epoxy resin. The corks 3 shall have a size matched with that of the piezoceramic transducers 1, and have a certain thickness to absorb the energy of pressure waves propagating along the inner wall of cylinder of the damper. A ring-shaped baffle 4 is arranged near the piezoceramic transducers 1 in the viscous damper 5 to protect the piezoceramic transducers 1 from being damaged during the use of the viscous damper 5, and the ring-shaped baffle 4 shall not be too large; holes are formed in the inner wall of cylinder of the viscous damper 5 to lead out the wires 2 connected on the piezoceramic transducers 1 and are sealed well to prevent oil leakage, and then the wires 2 led out are connected to external equipment.

A fluid viscosity quantification method is as follows:

Defining a viscosity variation index (VVI) to quantify a fluid viscosity of the viscous damper, and expressing VVI as $$VVI = \frac{V_{max}}{V_0} = e^{-\frac{2x(2\pi f)^2 v}{3c^3}} \qquad (1)$$

where $V_{max}$ is an amplitude of a receive signal; $V_0$ is an initial amplitude of an excitation signal; x is a distance between the two piezoceramic transducers; f is a frequency of the excitation signal; c is a propagation velocity of pressure waves in a fluid; and υ is a kinematic viscosity of the fluid;

The distance x between the two piezoceramic transducers, the initial amplitude $V_0$ of the excitation signal and the frequency f of the excitation signal are known parameters; replacing the propagation velocity c of the pressure waves in the fluid by an average velocity of the pressure waves during propagation in the fluid, substituting the above parameters and the amplitude $V_{max}$ of the signals received by the piezoceramic transducers into equation (1), obtaining the kinematic viscosity υ of the fluid, and thereby quantifying the viscosity of the fluid in the viscous damper.

It should be noted that the piezoceramic transducers are used in a pair, with either one being used as a signal transmitter, and the other being used as a signal receiver. Correspondingly, the corks are also used in a pair. It is preferred to use the piezoceramic transducers encapsulated in copper shells, as such transducers will have stable performance and easy installation.

The invention claimed is:

1. A viscous damper fluid viscosity monitoring device based on piezoceramic transducers, comprising piezoceramic transducers (1), wires (2), corks (3), a baffle (4) and a viscous damper (5); two piezoceramic transducers (1) are arranged in the viscous damper fluid viscosity monitoring device, with one being used as a signal transmitter, and the other being used as a signal receiver; the piezoceramic transducers (1) are bonded to the surface of the corks (3) with epoxy resin, and then the corks (3) are bonded to the inner wall of cylinder of the viscous damper (5) with epoxy resin; a ring-shaped baffle (4) is arranged near the piezoceramic transducers (1) in the viscous damper (5) to protect the piezoceramic transducers (1) from being damaged during the use of the viscous damper (5); holes are formed in the inner wall of cylinder of the viscous damper (5) to lead out the wires (2) connected on the piezoceramic transducers (1) and are sealed well, and then the wires (2) led out are connected to external equipment.

2. A fluid viscosity quantification method using the viscous damper fluid viscosity monitoring device of claim 1, comprising the following steps:

defining a viscosity variation index VVI to quantify a fluid viscosity of the viscous damper, and expressing VVI as $$VVI = \frac{V_{max}}{V_0} = e^{-\frac{2x(2\pi f)^2 v}{3c^3}} \quad (1)$$

where $V_{max}$ is an amplitude of a receive signal; $V_0$ is an initial amplitude of an excitation signal; x is a distance between the two piezoceramic transducers; f is a frequency of the excitation signal; c is a propagation velocity of pressure waves in a fluid; and υ is a kinematic viscosity of the fluid;

the distance x between the two piezoceramic transducers, the initial amplitude $V_0$ of the excitation signal and the frequency f of the excitation signal are known parameters; replacing the propagation velocity c of the pressure waves in the fluid by an average velocity of the pressure waves during propagation in the fluid, substituting the above parameters and the amplitude $V_{max}$ of the signals received by the piezoceramic transducers into equation (1), obtaining the kinematic viscosity υ of the fluid, and thereby quantifying the viscosity of the fluid in the viscous damper.

* * * * *